INVENTORS:
HERMANN SCHNELL, RUDOLF SCHNEIDER, GOTTFRIED GERLACH, OTTO COURT.

United States Patent Office 3,535,280
Patented Oct. 20, 1970

3,535,280
CONDENSING OF POLYCARBONATES IN WIPED THIN-FILM REACTOR
Hermann Schnell, Krefeld-Uerdinger, Gottfried Gerlach, Krefeld-Bockum, Rudolf Schneider, Krefeld, and Otto Court, Deutsche, Germany, assignors to Farbenfabriken Bayer Aktiengesellschaft, Leverkusen, Germany, a corporation of Germany
Continuation of application Ser. No. 384,662, July 23, 1964. This application July 18, 1968, Ser. No. 745,890
Claims priority, application Germany, July 24, 1963, F 40,328
Int. Cl. C08g 17/13
U.S. Cl. 260—47                                                          5 Claims

ABSTRACT OF THE DISCLOSURE

An apparatus for controllably volatilizing the volatile materials from a thermoplastic which includes an elongated chamber having inlet and outlet means into which the thermoplastic is introduced at a rate substantially equal to the rate at which it can be wiped along the inner walls of the chamber in a thin film by a flexible centerless worm rotatably mounted within the chamber, the outer surface of the worm being in wiping contact with the inner surface of the chamber.

---

Figure 1:
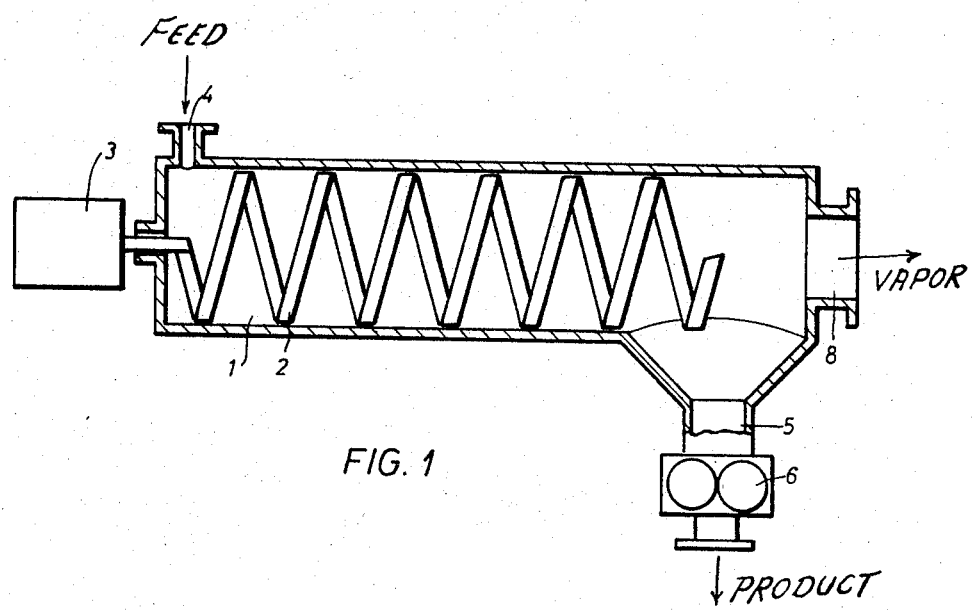

This invention relates to the removal of volatile byproducts from thermoplastics with a new evaporating apparatus, and is a continuation of copending application Ser. No. 384,662, filed July 23, 1964, now abandoned.

Heretofore in the production of thermoplastic products, the volatile byproducts or solvents have been removed from the thermoplastic in a vented extruder. Vented extruders are expensive pieces of equipment which begin at hundreds of thousands of dollars in price and go up rapidly depending on the length and size of the extruder. Notwithstanding, it is often difficult to use extruders for such a purpose because the thermoplastic will often foam due to volatilization of the solvent or byproduct in the thermoplastic material in the unit and the foamed thermoplastic will solidify in the barrel of the extruder, causing it to plug and cease to operate.

This has proven to be a particularly vexatious problem in the production of polycarbonate plastics. Polycarbonate plastics are produced by either of two now well known processes. One involves the reaction of a dihydroxy compound with a carbonyl halide in an aqueous solution to produce a dough which is then dried and extruded to form strands or pellets of the thermoplastic polycarbonate material. Another process, well known and used commercially for the production of polycarbonate plastics, involves the transesterification of the diphenyl carbonate, for example, with a dihydroxy aromatic compound with the simultaneous splitting off and preefrably removal of a phenol. When the polycarbonates are produced by a transesterification procedure the reaction is usually carried out in a well stirred kettle under high vacuum. In the first stage of the polymerization the melt is heated to a temperature of about 180° C. to about 220° C. under pressure of 20–30 mm. of mercury. About 80–90 percent of the byproduct phenol is removed under these conditions in about one to three hours. The temperature is then gradually increased with the reduction in pressure and a more or less viscous melt is formed. It is extremely difficult to stir the kettle under these conditions and a limit exists on the osmotic molecular weight which can be obtained in this equipment. For example, a polymer having an intrinsic viscosity of about 0.6 in dioxane at 30° C. will have a melt viscosity of about 500,000 poises at 240° C. The vacuum kettles, commercially available for such a process, are not capable of satisfactorily stirring the melt of polycarbonate so that the byproducts are satisfactorily removed.

The foregoing illustrates the difficulties inherent in prior art processes for the removal of volatile byproducts and solvents from thermoplastics such as polycarbonates. It is to be understood that similar difficulties exist in the treatment of other thermoplastic materials having the same or similar viscosities so that the foaming of thermoplastics has been a long-continuing, serious and expensive problem when vented extruders are used.

It is therefore an object of this invention to provide an improved apparatus and method for preparing thermoplastic products.

A further object of the invention is to provide an improved apparatus and method of preparing thermoplastics which have a high melt viscosity.

Still another object of this invention is to provide an improved apparatus and method of preparing thermoplastics wherein the volatile reaction byproducts or solvents can be easily removed without prior art disadvantages in an extruder type device.

Still another object of this invention is to provide an improved apparatus and method for preparing polycarbonates which have a high melt viscosity.

Another object of this invention is to provide improved vented type extruder for the production of thermoplastic materials with the simultaneous removal of byproducts and/or volatile solvents.

Still a further object of this invention is to provide an improved reactor for preparing thermoplastic materials which have a high melt viscosity and which generate or contain inter alia relatively high boiling byproducts.

The foregoing objects and others which will become apparent from the following description are accomplished in accordance with this invention, generally speaking, by controllably volatilizing the solvents and/or byproducts produced in a thermoplastic by means of an apparatus including an elongated essentially cylindrical chamber having inlet and outlet means and heating means surrounding the chamber, into which the thermoplastic containing the solvent and/or byproducts to be volatilized is introduced at a rate essentially equal to the rate at which the thermoplastic can be wiped as a thin film along the inner walls of the chamber with a distribution means which is a centerless worm such as a helical or spiral spring rotatably mounted in the chamber, the outer surface of the worm being in wiping contact with the inner surface of the chamber; the thermoplastic is thus wiped in a thin film along the inner surface of the chamber while the volatilized product evolves and is withdrawn. In the apparatus of this invention, at least one end of the centerless spiral is mounted and driven while the other end may either be fixed or else it may float freely if desired, the latter embodiment being preferred. The pipe may be positioned in any suitable manner, either vertically or horizontally or at any angle between vertical and horizontal although it is preferred to position the pipe vertically above the inlet end of an extruder.

The inner diameter of the pipe, the length of the pipe, the pitch of the spiral spring or worm, the speed of rotation of the spiral spring, loading of the apparatus, the course of the polycondensation reaction, and the properties of the polycondensate are preferably in harmony with each other for best results. The most favorable relationship can easily be determined. In general, good results are obtained when the pitch of the worm is about 10–200 mm., the speed of rotation of the worm is about 10–150 r.p.m. and the dimensions of the pipe are such that the inner diameter is from about 100–200 mm. and has a length of about 400 to about 2000 mm. A pipe of this size may be operated at a loading rate of about 1–30 kg./ hour. The device may be smaller or larger, but it is preferred that the rate of loading and that the pitch of the worm, speed of rotation, size of the barrel, the course of the reaction and the properties of the reaction product be in the same proportion with respect to one another as is represented by the values listed above.

The special apparatus of this invention is designed to provide zones through which a stream of thermoplastic material is moved with the sequential removal of solvent therefrom. Therefore, if desired, the pipe or elongated chamber may be heated to different temperatures at the inlet and exit end and it is frequently advantageous to have the temperature increased from the inlet portion to the exit portion. It is often desirable to heat the ouside of the pipe as well as to supply heat to the thermoplastic being treated through the worm or spring spiral. In such a case it is possible for the helical coil or spring to be made of a hollow wire which is heated by passing steam or a hot gas such as hot argon, hot nitrogen or the like through it. Alternately, the wire may be made of an electrically resistant material which is adapted for electrical heating. In general, suitable working temperatures at which the pipe and/or spring are heated lie between about 50° C. and about 400° C.

As already stated, the pipe may be positioned in any suitable way either vertically or horizontally or at any angle between vertical and horizontal. It is preferred, however, to have the pipe positioned vertically above the inlet end of an extruder for finishing the thermoplastic into spaghetti-like strands. When the pipe is in such a position it is fed at the top with relatively solvent rich or byproduct rich thermoplastic compositions, the helical spring wipes the thermoplastic composition onto the inner wall of the pipe and simultaneously transports it toward the feed section of the extruder. At the same time a vacuum is placed on the inside of the pipe which also has the centerless worm or spring rotating therein and the solvent or byproduct vapors are easily removed and may be passed to the distillation column if it is desired.

The apparatus of this invention is more clearly understood by reference to the accompanying drawing in which it is schematically illustrated. The apparatus includes a pipe 1 inside which is a spiral steel spring 2 which is free at one end and which is set in rotation by a drive means 3 at the other end. The pipe is provided with an inlet 4 for introduction of a thermoplastic material and a vent 8 for the removal of solvents or byproducts. At the exit end 5 of the chamber there is provided a pump, gear pump 6 in FIG. 1, and extruder 7 in FIG. 2 for removal of the essentially byproduct free or solvent free thermoplastic composition from the chamber.

A preferred form of the apparatus involves the use of a steel pipe with a compressed coil spring inserted in the steel pipe and engaging the inside walls of the pipe, so that when it is rotated inside the pipe it operates to progressively move the thermoplastic melt or solution along the inside wall of the pipe from the inlet end to the exit end. It is preferred that the helical spring not touch the wall of the pipe so that a thin film of the thermoplastic will be deposited on the wall of the pipe and moved from the inlet to the outlet end. The lower the viscosity of the solution or the melt, the smaller the cleft between the spring and the wall of the pipe should be. Thus said cleft may amount from about 0.5 to about 3 mm.

The preferred apparatus also includes an inlet end adapted with means for applying a vacuum to remove the volatile byproducts and means for controlling the temperature both of the elongated chamber or pipe and of the spiral inside the pipe. It is desirable to provide some means for removing the thermoplastic at the exit end of the tube including gear pumps or an extrusion type device. The inside wall of the elongated chamber is relatively smooth and the spring is inserted into the tube under sufficient pressure so that it will exert the desirable wiping action and an action to impel the thermoplastic composition forward from the inlet end towards the exit end of the pipe. During the time that the spiral is pushing the polycarbonate or other thermoplastic solution from one end of the pipe to the other a vacuum, if desired, is applied to the pipe and solvent vapors or volatilized byproducts are removed and, if desired, distilled.

Thermoplastic products may be produced in the apparatus of this invention with the simultaneous removal of volatile byproducts and/or solvents. The thermoplastic material or reaction components thereof are preferably passed through a tube having an inlet end and exit end with a spiral screw mounted inside the tube and adapted to wipe the preferably molten thermoplastic material along the inside of the barrel of the tube while the center is open and, if desired, free for application of the vacuum, to a large area of the thermoplastic material thereby making it possible to pull solvent and/or volatile byproducts from the thin layer of material as it is being transported by the spiral spring from the inlet end to the exit end of the tube. Thus the starting materials or precondensates of the thermoplastic materials are fed into the tube containing the helical spring which is preferably vented under reduced pressure. The spring is then rotated inside the tube and the thermoplastic materials are forced in a thin layer along the inner wall of the tube which may be heated throughout, even to the point of exit where the finished product is removed. The loading of the tube is such that the inner part of the spring spiral remains free. Thus, as the spring spiral rotates inside the tube it is somewhat flexible so that if it becomes clogged in a certain place, more torque is applied rotatably to the shaft of the spring to such an extent that it overcomes the resistance of the part clogging the inside of the tube. The volatile reaction products or solvent vapors come off of the reacting material or solvent-bearing material due to the heat applied to the material through the wall of the pipe or elongated chamber or through the worm or spiral spring inside the chamber and are vented off of the barrel preferably under a partial vacuum. If necessary, the vent leading off the barrel or pipe can be connected to a distillation column to collect the solvent or volatile byproduct.

As the solvent or volatile byproducts are removed from the thermoplastic compositions in the apparatus of this invention, the thermoplastic is transformed from a dilute solution to a more concentrated solution and, if desired, to a solvated gel to the molten state. It is preferred that the rate of rotation of the spiral inside the tube and the pitch of the spiral is so adjusted that the solvent is removed and the thermoplastic passes from the exit end of the tube just as it becomes a molten, essentially solvent free, essentially byproduct free thermoplastic product. The invention is particularly applicable to the removal of solvent from polycarbonate solutions as well as to the removal of the byproduct phenol when the polycarbonate is prepared by the transesterification procedure. Further, in the heretofore known processes, especially for the production of polyarylcarbonates by the transesterification procedure, it was often necessary to have a residence time of 8–10 minutes. Many advantages are readily apparent for such a procedure, not the least of which is the production of a polycarbonate which has not been subjected to the prolonged heating necessary to remove the byproduct phenol in the vacuum kettle. Residence times of 2–20 minutes are common when using the apparatus of the present invention.

Any suitable thermoplastic may be produced or treated in the apparatus of this invention, including polycarbonates, polyesters, polyamides, polyester amides, polyurethanes and similar thermoplastics where the process involves the production of volatile byproducts or the use of solvents.

Any suitable polycarbonate may be prepared or purified by this process including those disclosed in U. S. Pats. 3,043,800 and 3,022,272, as well as the polycarbonates disclosed in a book by Christopher and Fox, entitled "Polycarbonates," Reinhold Publishing Corporation, 1962. Reference is particularly made to pages 13–20. Additional polycarbonates are disclosed in the German Pat. 959,497. Generally speaking, in the production of polycarbonates any suitable dihydroxy compound including aliphatic, cycloaliphatic and aromatic dihydroxy compounds may be transesterified with any suitable dicarbonate including dialiphatic, dicycloaliphatic and diaromatic carbonates. Alternately the dihydroxy compounds may be reacted with phosgene in an aqueous solution or suspension of any alkali or alkaline earth metal salt of the dihydroxy compound, preferably in the presence of any inert solvent for the reaction, in accordance with the process disclosed on page 15 of the book by Christopher and Fox cited above.

For example there may be mentioned, as aliphatic dihydroxy compounds: ethylene glycol, diethylene glycol, triethylene glycol, polyethylene glycol, thiodiglycol, ethylene dithiodiglycol, the di-, and polyglycols produced from propyleneoxide-1,2, o, m, or p-xylylene glycol, propanediol-1,3, butanediol-1,3, butanediol-1,4, 2-methylpropanediol-1,3, pentanediol-1,5, 2-ethylpropanediol-1,3, hexanediol-1,6, octanediol-1,8, 1-ethylhexanediol-1,3, and decanediol-1,10.

As cycloaliphatic dihydroxy compounds: cyclohexanediol-1,4, cyclohexanediol-1,2, 2,2-(4,4'-dihydroxy-dicyclohexylene)-propane and 2,6-dihydroxydecahydroanphthalene, as aromatic dihydroxy compounds: hydroquinone, resorcinol, pyrocatechol, 4,4'-dihydroxydiphenyl, 2,2'-dihydroxydiphenyl, 1,4-dihydroxynaphthalent, 1,6-dihydroxynaphthalene, 2,6-dihydroxynaphthalene, 1,2-dihydroxynaphthalene, 1,5-dihydroxynaphthalene, dihydroxyanthracene, 2,2-dihydroxydinaphthyl-1,1' and o, m, p-hydroxybenzylalcohol.

Preferred classes of aromatic dihydroxy compounds are the dimonohydroxy arylene sulphones and particularly the di-monohydroxy arylene alkanes, such as 4,4'-dihydroxydiphenylene sulphone, 2,2'-dihydroxydiphenylene sulphone, 3,3'-dihydroxyldiphenylene sulphone, 4,4'-dihydroxy-2,2'-dimethyl-diphenylene sulphone, 4,4'-dihydroxy-3,3'-dimethyl-diphenylene sulphone, 2,2'-dihydroxy-4,4'-dimethyldiphenylene sulphone, 4,4'-dihydroxy-2,2'-diethyldiphenylene sulphone, 4,4'-dihydroxy-3,3'-diethyldiphenylene sulphone, 4,4'-dihydroxy-2,2'-di-tert. butyldiphenylene sulphone, 4,4'-dihydroxy-3,3'-di-tert. butyldiphenylene sulphone and 2,2'-dihydroxy-1,1'-dinaphthylene sulphone, 4,4'-dihydroxy-diphenylene-methane, 1,1-(4,4'-dihydroxy-diphenylene)-ethane, 1,1-(4,4'-dihydroxy-diphenylene)-propane, 1,1-(4,4'-dihydroxy-diphenylene)-butane, 1,1-(4,4'-dihydroxy-diphenylene)-2-methyl-propane, 1,1-(4,4'-dihydroxy-diphenylene)-heptane, 1,1-(4,-4'-dihydroxy-diphenylene)-1-phenyl-methane, (4,4'-dihydroxy-diphenylene)-(4-methyl-phenylene)-methane, (4,4'-dihydroxy-diphenylene)-(4-ethylphenylene)-methane, (4,-4' - dihydroxy - diphenylene) - (4 - isopropyl - phenylene) - methane, (4,4' - dihydroxy - diphenylene) - (4-butyl - phenylene) - methane, (4,4' - dihydroxy - diphenylene) - benzyl - methane, (4,4' - dihydroxy - diphenylene) - alpha - furyl - methane, 2,2 - (4,4' - dihydroxy - diphenylene) - propane, 2,2 - (4,4' - dihydroxy-diphenylene) - butane, 2,2 - (4,4' - dihydroxy - diphenylene) - pentane (melting point 149–150° C.), 2,2 - (4,4'-dihydroxy - diphenylene) - 4 - methylpentane, 2,2 - (4,4'-dihydroxy - diphenylene) - heptane (boiling point 198–200° C. under 0.3 mm. mercury gauge), 2,2 - (4,4'-dihydroxy - diphenylene) - octane, 2,2 - (4,4' - dihydroxy-diphenylene) - nonane (melting point 68° C.), 1,1 - (4,4'-dihydroxy - diphenylene) - 1 - phenyl - ethane, (4,4' - dihydroxy - diphenylene) - 1 - (alpha - furyl) - ethane, 3,3 - (4,4' - dihydroxy - diphenylene) - pentane, 4,4 - (4,4' - dihydroxy - diphenylene) - heptane, 1,1 - (4,4'-dihydroxy - diphenylene) - cyclopentane, 1,1 - (4,4'-dihydroxy - diphenylene) - cyclohexane, 2,2 - (4,4' - dihydroxy - diphenylene) - decahydronaphthalene, (melting point 181° C.), 2,2 - (4,4' - dihydroxy - 3,3' - di- cyclohexyl - diphenylene) - propane (melting point 144–146° C.), 2,2 - (4,4' - dihydroxy - 3 - methyl - diphenylene) - propane (melting point 114° C.), 2,2 - (5,5' - dihydroxy - 3 - isopropyl - diphenylene) - butane, 1,1-(4,4' - dihydroxy - 3,3' - dimethyl - diphenylene) - cyclohexane, 2,2 - (4,4' - dihydroxy - 3,3' - dibutyl - diphenylene) - propane, 2,2 - (4,4' - dihydroxy - 3,3' - diphenyldiphenylene) - propane, 2,2 - (4,4' - dihydroxy - 2,2'-dimethyl - diphenylene) - propane, 1,1 - (4,4' - dihydroxy-3,3' - dimethyl - 6,6' - dibutyl - diphenylene) - butane, 1,1 - (4,4' - dihydroxy - 3,3' - dimethyl - 6,6' - ditert. butyl - diphenylene) - ethane, 1,1 - (4,4' - dihydroxy-3,3' - dimethyl - 6,6' - di-tert. butyl - diphenylene) - propane, 1,1 - (4,4' - dihydroxy - 3,3' - dimethyl - 6,6' - ditert. butyl - diphenylene) - butane, 1,1 - (4,4' - dihydroxy-3,3' - dimethyl - 6,6' - di - tert. butyl - diphenylene)-isobutane, 1,1 - (4,4' - dihydroxy - 3,3' - dimethyl - 6,6'-di - tert. butyl - diphenylene) - heptane, 1,1 - (4,4' - dihydroxy - 3,3' - dimethyl - 6,6' - di - tert. butyl - diphenylene) - 1 - phenyl - methane, 1,1 - (4,4' - dihydroxy-3,3' - dimethyl - 6,6' - di - tert. butyl - diphenylene)-2 - methyl - pentane, 1,1 - (4,4' - dihydroxy - 3,3' - dimethyl - 6,6' - di - tert. butyl - diphenylene) - 2 - ethylhexane, and 1,1 - (4,4' - dihydroxy - 3,3' - dimethyl - 6,6'-di - tert. amyl - diphenylene) - butane, 2,2 - (4,4' - dihydroxy - dinaphthylene) - propane and 1,1 - (4,4' - dihydroxy-dinaphthylene)-cyclohexane.

Among the great number of suitable di-monohydroxy arylene alkanes the 4,4'-dihydroxy-diphenylene alkanes are preferred, especially the 2,2 - (4,4' - dihydroxy - diphenylene)-propane and the 1,1 - (4,4' - dihydroxy - diphenylene)-cyclohexane.

In some cases mixed polycarbonates prepared of at least two different dihydroxy compounds, especially such of at least one aromatic and at least one aliphatic dihydroxy compound, yield products with special properties.

The polycarbonates can be produced for example by introducing phosgene into solutions of dihydroxy compounds or of mixtures of the aforesaid dihydroxy compounds in organic bases, such as dimethylaniline, diethylaniline, trimethylamine, and pyridine, or in indifferent organic solvents, such as petrol, ligroin, cyclohexane, methylcyclohexane, benzene, toluene, xylene, chloroform, methylenechloride, carbon tetrachloride, trichloroethylene, dichloroethane, methylacetate, and ethylacetate, with addition of an acid-binding agent, e.g. tertiary amines. In some cases, there may be used also solvents having a higher boiling point such as, for example, mono- and dichlorobenzene and anisol, eventually in admixture with lower boiling solvents as mentioned above.

A process particularly suitable for producing polycarbonates consists in introducing phosgene into the aqueous solution or suspension of alkali or alkaline earth metal salts, such as lithium, sodium, potassium, and calcium salts of the dihydroxy compounds, preferably in the presence of an excess of a base, such as lithium, sodium, potassium, and calcium hydroxide or carbonate. The polycarbonate then precipitates out from the aqueous solution.

The conversion in the aqueous solution is promoted by the addition of reaction inert solvents of the kind mentioned above which are capable of dissolving phosgene and eventually the produced polycarbonate.

The reaction conditions should be so that one mole of the phosgene reacts with one mole of the dihydroxy compounds. Suitable temperatures are from about 0° C. to 100° C.

It is also possible to react bis-chloro-carbonates of dihydroxy compounds, with the aforementioned dihydroxy compounds. The condensation proceeds suitably in the presence of inert solvents, and acid-binding materials, e.g., tertiary amines.

When using phosgene or bis-chlorocarbonic acid esters as derivatives of the carbonic acid in producing polycarbonates catalysts also may be advantageous. Such catalysts are for instance tertiary or quaternary organic bases or salts thereof, such as trimethylamine, triethylamine, dimethylaniline, diethylaniline, dimethylcyclohexylamine, and pyridine, or for instance the corresponding hydrochlorides, and tetramethylammonium hydroxide, triethyloctadecylammoniumchloride, trimethyl-benzylammoniumfluoride, triethyl-benzylammoniumchloride, dimethyl-dodecylammoniumchloride, dimethylbenzyl-phenylammoniumchloride, trimethylcyclohexylammoniumbromide, and N-methyl-pyridiniumchloride, in amounts from about 0.05 to about 5 percent by weight. These compounds may be added to the reaction mixture before or during the reaction.

Furthermore in some of these cases it is preferable to add surface active agents, such as alkali metal salts of higher fatty acids or of sulphonic acids of higher aliphatic or of aromatic hydrocarbons and polyoxyethylated alcohols and phenols. Greater amounts of the quaternary ammonium bases mentioned above, too, act as such surface active agents.

In the production of polycarbonates according to the various processes it further is advantageous to employ small amounts of reducing agents, for example sodium or potassium sulphide, sulphite, and dithionite, or free phenol and p-tert. butyl-phenol.

By adding monofunctional compounds which are capable of reacting with phosgene or with the endgroups of the polycarbonates consisting of the chlorocarbonic acid ester group and which terminate the chains, such as the phenols, for instance, the phenol, the tert. butylphenyl, the cyclohexylphenyl, and 2,2-(4,4'-dihydroxyphenylene-4'-methoxy-phenylene)-propane further aniline and methylaniline, it is possible to regulate the molecular weight of the polycarbonates in wide limits.

The polycarbonates can also be produced as follows: The dihydroxy compounds can be reesterified with carbonic acid diesters, e.g., with the dimethyl-, diethyl-, dipropyl-, dibutyl-, diamyl-, dioctyl-, dicyclohexyl-, and especially with the diphenyl- and di- o, m, or p-toluyl-carbonate, or with mixed esters, for instance with the methyl-ethyl, the methyl-propyl, the ethyl-propyl, the methyl-cyclohexyl, the ethyl-cyclohexyl, the propyl-cyclohexyl, the methyl-phenyl, the ethyl-phenyl, the propyl-phenyl, the ethyl-o, m, or p-toluyl and the cyclohexyl-phenyl carbonate particularly at elevated temperatures from about 50-330° C. and especially from about 120 to about 290° C. and under reduced pressure for instance up to 0.1 mm. mercury gauge.

By reesterifying the mentioned carbonic acid diesters, the corresponding alkyl or cycloalkyl alcohols or the corresponding phenols are split off.

As diesters of carbonic acid there may also be used dialkyl-, dicycloalkyl-, or diaryl dicarbonates of aromatic dihydroxy compounds especially of halogen-containing di-(monohydroxy-aryl)-alkanes and/or of halogen free di-(monohydroxy-aryl)-alkanes of the kind mentioned above.

Suitable bis-diesters of carbonic acid of this kind are for instance: bis-alkyl, e.g., bis-ethyl, bis-propyl, bis-isopropyl, bis-butyl, bis-amyl, bis-hexyl, bis-cycloalkyl, e.g., bis-cyclohexyl and bis-methylcyclohexyl, and bis-aryl, e.g., bis-phenyl, bis-cresyl, bis-cyclohexylphenyl and bis-naphthyl carbonates of resorcinol, hydroquinone, 2,4-dioxytoluene, 2,5-dioxytoluene, 3,5-dioxytoluene, 4,4'-dioxydiphenyl, 2,4'-dioxydiphenyl, 4,4'-dioxy-3-cyclohexyldiphenyl, 1,4-dioxynaphthalene, 1,6-dioxynaphthalene, 2,6-dioxynaphthalene, 1,5-dioxyanthracene and of di-(mono-oxyaryl)-alkanes, in particular of halogen-containing ones as described above.

When reesterifying such bis-diesters of carbonic acid with dihydroxy compounds the corresponding monohydroxy compound, which was originally a component of the bis-diester, is split off.

On the other hand it is also possible to heat such bis-diesters of carbonic acid alone. In this case separation of corresponding neutral alkyl, cycloalkyl, or aryl carbonates takes place while the corresponding polycarbonate is formed.

The reesterifying process has to be conducted while excluding oxygen. We prefer to pass an inert gas such as hydrogen, nitrogen, or carbon dioxide gas through the melt.

The reesterifications may be activated by reesterifying catalysts, such as inorganic bases, for example, caustic soda and potassium hydroxide, high boiling organic bases, such as acridine, metal hydrides such as lithium and calcium hydride, alkali or alkaline earth metals such as sodium, potassium, magnesium, and calcium, metal oxides such as zinc oxide, aluminum oxide, lead oxide, antimonotrioxide, cerium oxide, and boron oxide, acids such as phosphoric acid and p-toluene sulphonic acid, and salts such as sodium benzoate, calcium acetate, and boron phosphate, and alcoholates and phenolates.

Any suitable polyester may be processed in accordance with the invention including for example the condensation of any suitable polyhydric alcohol with any suitable carboxylic acid. Suitable polyhydric alcohols include ethylene glycol, 1,3-propylene glycol, 1,4-butane diol, 1,6-hexamethylene glycol, trimethylol propane, glycerine and the like. Suitable acids include for example phthalic acid, terephthalic acid, maleic acid, benzene tricarboxylic acid and the like. Synthetic condensation products of this type may be found in the book entitled "Polymer and Resins" by Golding, D. van Nostrand 1959, page 259. Instead of the acids mentioned the diesters thereof also may be used.

Any suitable polyamide may be used including those prepared by the inclusion of some glycol so that a polyester amide results. Polyamides are disclosed, for example, in the above-cited "Polymer and Resins" book on page 314.

The viscosity of the melt or solution of the material to be worked at the working temperatures should not be too slow; generally suitable viscosities lie between about 200 and about 50,000 poises and more. However, it is also possible to work up diluted solutions with a low viscosity, for example, of 5 or 10 poises only. In such a case the cleft between the spring and the wall of the pipe should be very slow, for example, about 0.5 to about 0.8 mm.

The thermoplastics of the invention are useful for the production of many molded plastic articles including, for example, bottles, dishes, automotive parts, soap trays and the like.

The invention is further illustrated by the following examples in which parts are by weight unless otherwise indicated.

EXAMPLE 1

Figure 2:
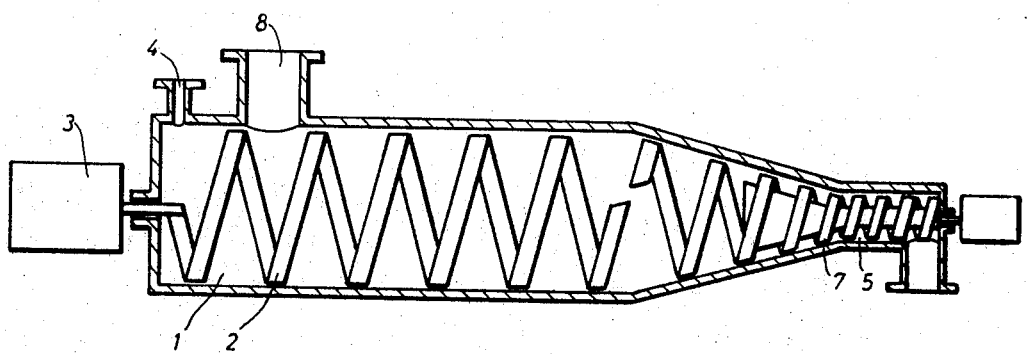

Sufficient of a melt of polyarylcarbonate prepared from 2,2'-bis-(4-hydroxy phenyl)-propane and diphenyl carbonate in the molar ratio of 1 mole of the former to 1.3 moles of the latter and having a relative viscosity of 1.100 measured in a 0.5% solution in methylene chloride at about 20° C. is fed into a pipe, the inner diameter of which is 100 mm. and the length is 600 mm., by a gear pump at the rate of about 5.0 kg./hour. The polyarylcarbonate is incompletely polymerized having been subjected to a temperature of 200° C. and a pressure of 120 mm. Hg for about 2 hours. The pipe is externally heated by means of a hot oil mantel about the pipe to about 170 to 220° C. and has a coil spring as shown in FIG. 1 having a pitch of 45 mm. per tourning round and rotated therein at a speed of about 120 r.p.m. The cleft between the spring and the wall of the pipe amounts 2 mm. The pipe is vented as shown in FIG. 2 and a vacuum of about 1 mm. Hg is applied to the vent. The residence time of the polyarylcarbonate in the pipe is about 8 to 10 minutes whereby the relative viscosity of the finished polyarylcarbonate is about 1.350. A receiver is attached to the vent and about 1.5% of the condensate is split off, based on the amount of the precondensate introduced, and collected in a receiver. The resulting polyarylcarbonate is of a high quality and high molecular weight.

EXAMPLE 2

Following the procedure of Example 1 except that the pipe is heated to 270 to 280° C. and the speed of rotation of the worm is 40 r.p.m., a precondensate of terephthalic acid-bishydroxy-ethyl ester is passed at a rate of 1.8 kg./hour and further condensed after a residence time of eight minutes whereby the relative viscosity measured in a 0.5% solution in a mixture of 40% tetrachloroethane and phenol at 20% increases from 1.180 for the precondensate to 1.280 for the finished product.

EXAMPLE 3

The apparatus as described in Example 1 is used but the cleft between the spring and the wall of the pipe amounts only 0.7 mm. and the spring rotates at a speed of only about 40 r.p.m. The pipe is heated to about 90 to 110° C.

A 10% solution of a high molecular weight polycarbonate the relative viscosity of which is 1.32 measured in a 0.5% solution in methylene chloride at about 20° C. is fed into the pipe at a rate of about 6.0 kg./hour. One obtains a more concentrated polycarbonate solution containing about 43% polycarbonate.

The 10% polycarbonate solution was obtained by reacting an aqueous alkaline solution of 2,2-bis-(4-hydroxy phenyl)-propane with phosgene in the presence of a corresponding amount of methylene chloride and separating the methylene chloride solution from the aqueous phase in known manner.

It is to be understood that the foregoing working examples are given for the purpose of illustration and that any other suitable thermoplastic, precondensate, vented pipe containing a coil spring, residence time, speed of rotation, or the like could have been used in the examples provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:
1. A method of processing and completing the condensation of a polycarbonate resin mixture that initially contains substantial amounts of a vaporizable material comprising:
   (a) introducing said mixture into an elongated cylindrical reaction zone, said reaction zone having an inlet and exit, an elongated cylindrical reaction surface therebetween and a flexible, centerless wiping helix therein mounted for turning at only the inlet end of said reaction zone and spaced in wiping relationship from said reaction surface;
   (b) establishing said mixture as a thin film over said reaction surface and moving the same from said inlet to said exit by the progressive movement of said helix thereover, the amount of said mixture being introduced into said reaction zone being limited to maintain said thin film and said material under the obtaining conditions having a viscosity in the range of 200 to 50,000 poises;
   (c) maintaining reaction conditions, including heat input and a pressure substantially less than atmospheric, sufficient to volatilize said vaporizable material and further to condense said polycarbonate resin, resulting in a substantial increase in the viscosity thereof;
   (d) removing vapors from said reaction zone;
   (e) removing a melt of said polycarbonate resin from said exit under positive mechanical compulsion.

2. The method of claim 1 wherein said reaction zone is vertical, said centerless worm rotatably mounted within said cylinder and wiping relationship is a spacing in the range of 0.5 to 3 mm. from said reaction surface, said mixture results from a transesterification of diphenyl carbonate, said vaporizable material is phenol and said positive mechanical compulsion is obtained by means of an extruder.

3. Apparatus for processing a viscous condensable polycarbonate mixture that substantially increases in viscosity during the processing with loss of volatile matter, said mixture having initially a viscosity in the range of 200 to 50,000 poises under the conditions of processing, comprising:
   (a) an elongated cylindrical chamber having an inlet and outlet;
   (b) a series of resiliently interconnected wiper elements in the form of a hollow helix mounted for turning at only the inlet end of said chamber and spaced in wiping relationship from the inner wall of said chamber and adapted to progressively advance said mixture as a thin film from said inlet to said outlet by rotation of the helix about its axis;
   (c) means for introducing said mixture into said inlet at a rate to maintain said thin film;
   (d) evacuation means for maintaining said chamber under vacuum and for removing volatilized matter therefrom;
   (e) heating means for heating said thin film; and
   (f) means associated with said exit for extracting thermoplastic product from said chamber under positive mechanical compulsion.

4. The apparatus of claim 3 wherein said chamber is vertical and said means for extracting the thermoplastic product is an extruder.

5. The apparatus of claim 2 wherein the space of said wiping relationship is in the range of 0.5 to 3 mm. in operation.

References Cited

UNITED STATES PATENTS

| | | | |
|---|---|---|---|
| 3,017,289 | 1/1962 | Miller et al. | 159—6 |
| 3,211,209 | 10/1965 | Latinen et al. | 159—6 |
| 2,927,634 | 3/1960 | Gudheim | 159—6 |
| 3,266,555 | 8/1966 | Thier | 159—6 |
| 3,292,683 | 12/1966 | Buchi et al. | 159—6 |
| 3,260,655 | 7/1966 | McGee et al. | 202—236 |

FOREIGN PATENTS

| | | |
|---|---|---|
| 1,136,982 | 9/1962 | Germany. |

NORMAN YUDKOFF, Primary Examiner

J. SOFER, Assistant Examiner

U.S. Cl. X.R.

159—6, 13, 49

PO-1050
(5/69)

UNITED STATES PATENT OFFICE
CERTIFICATE OF CORRECTION

Patent No. 3,535,280           Dated    Oct. 20, 1970

Inventor(s)    Herman Schnell, et al.

It is certified that error appears in the above-identified patent and that said Letters Patent are hereby corrected as shown below:

Col. 10, lines 10 and 11, cancel "centerless worm rotatably mounted within said cylinder and."

Signed and sealed this 6th day of April 1971.

(SEAL)
Attest:

EDWARD M. FLETCHER, JR.          WILLIAM E. SCHUYLER, JR.
Attesting Officer                 Commissioner of Patents